Oct. 30, 1951  O. E. ANDRUS  2,573,126
SUBMERSIBLE ELECTRIC MOTOR
Filed Jan. 21, 1948  3 Sheets—Sheet 1

INVENTOR.
Orrin E. Andrus
BY
ATTORNEY.

Oct. 30, 1951     O. E. ANDRUS     2,573,126
SUBMERSIBLE ELECTRIC MOTOR
Filed Jan. 21, 1948     3 Sheets-Sheet 2
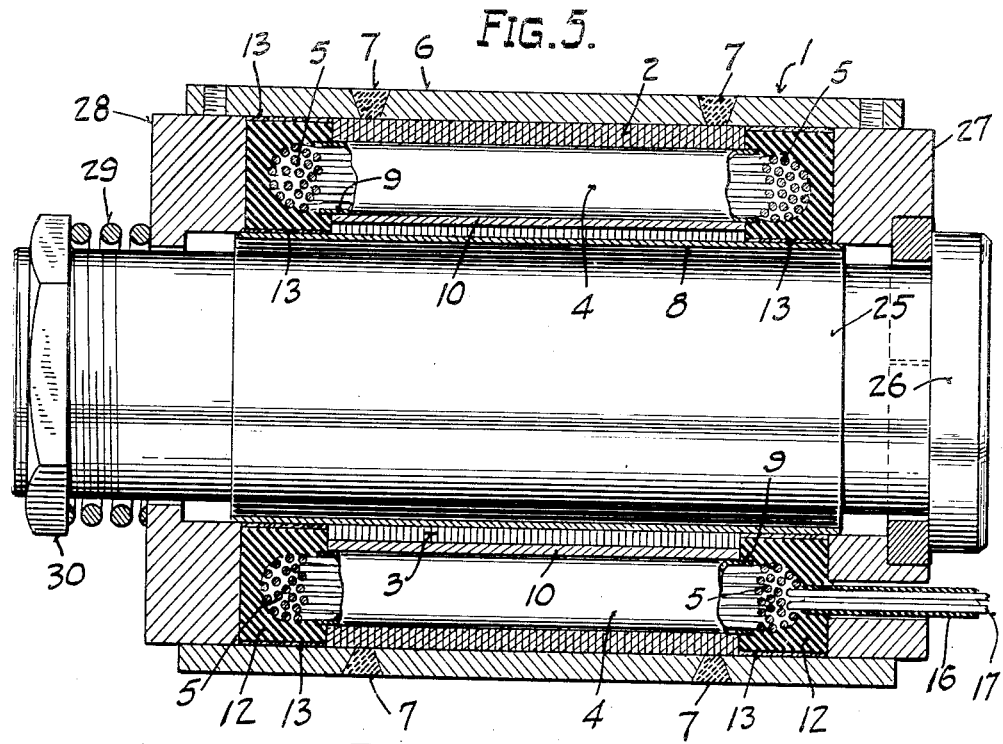
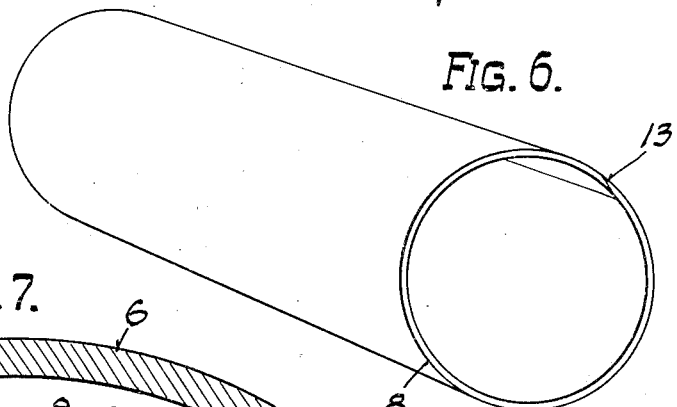
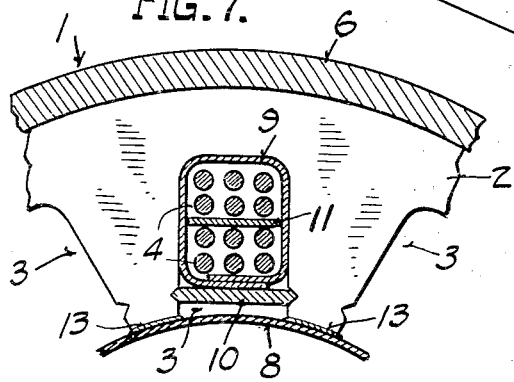
INVENTOR.
Orrin E. Andrus
BY
ATTORNEY.

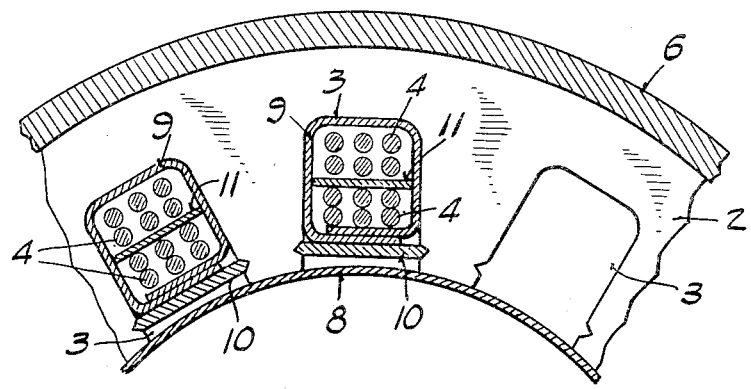
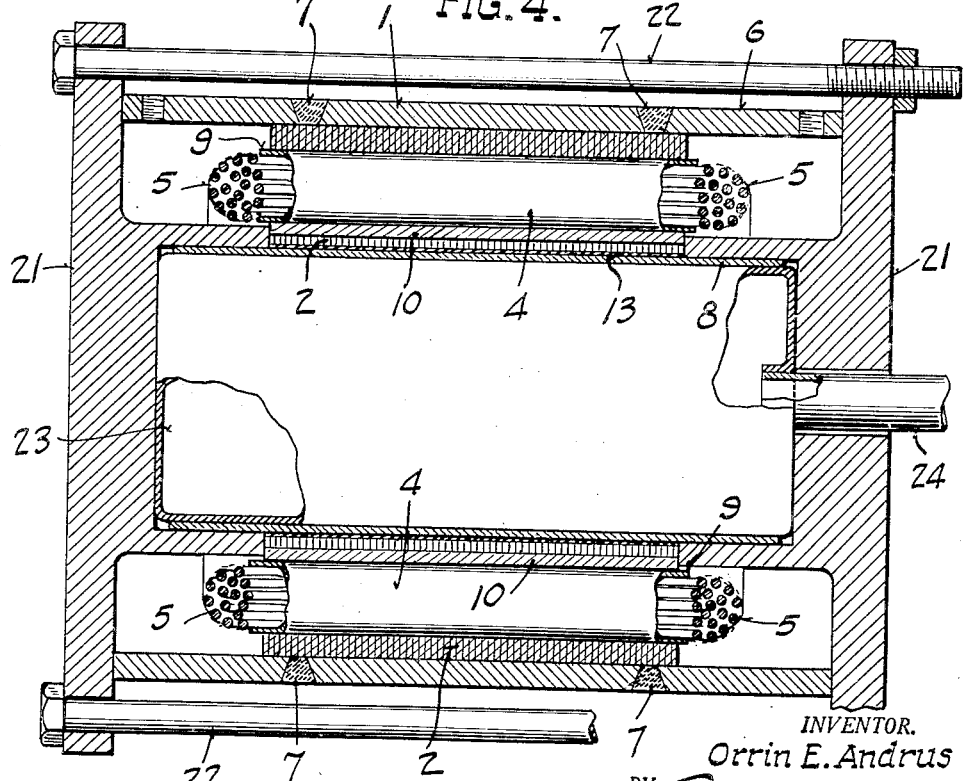

Patented Oct. 30, 1951

2,573,126

UNITED STATES PATENT OFFICE 2,573,126

SUBMERSIBLE ELECTRIC MOTOR

Orrin E. Andrus, Altadena, Calif., assignor to A. O. Smith Corporation, Milwaukee, Wis., a corporation of New York Application January 21, 1948, Serial No. 3,388

3 Claims. (Cl. 171—252)

1

This invention relates to a submersible electric motor, and has particular reference to the construction of stators.

The principal object of the invention is to provide a stator that will operate submerged in water, oil or the like.

Another object is to provide a stator in which the windings and end coils are effectively sealed from contact with moisture.

In operating dynamo-electric apparatus having stators submerged in fluid it is necessary to protect the windings and end coils from deterioration by moisture and the like. The invention proposes to seal the windings and end coils against conduit with moisture by enclosing the stator in concentric tubes and sealing the end coils with molded rubber.

Other objects of the invention will appear hereinafter in connection with the following description of an embodiment thereof illustrated in the accompanying drawing.

In the drawing:

Fig. 3 is a similar section taken on line 3—3 of Figure 1;

Fig. 4 is a longitudinal sectional view showing a fixture holding the inner tube when expanded against laminations and cemented thereto;

Fig. 5 is a longitudinal sectional view of apparatus employed in molding rubber around the end coils;

Fig. 6 is a perspective view of an inner tube formed from a sheet of plastic or other non-magnetic material; and Fig. 7 is a detail sectional view across a stator in which the tube is of sheet material and bonded to the laminations.

Figure 1:
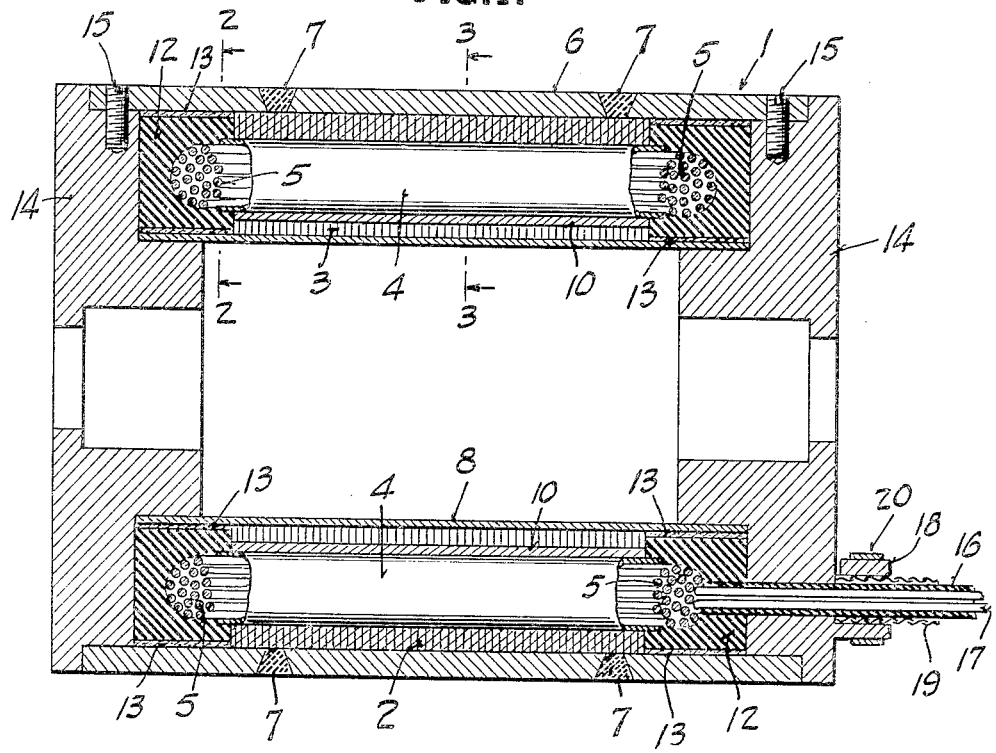
Figure 1 is a central longitudinal sectional view of a stator constructed in accordance with the invention.
Figure 2:
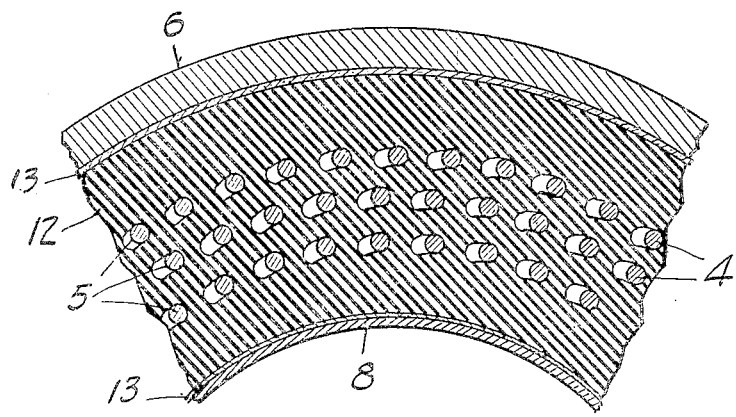
Fig. 2 is a fragmetnary transverse section taken on line 2—2 of Figure 1.

The dynamo-electric device of the invention is illustrated in the drawings by a stator 1 comprising a plurality of laminations 2 stacked together and provided with longitudinal slots 3 to receive the windings 4 having the end coils 5 disposed at each end of the stacked laminations 2.

The laminations 2 carrying windings 4 and the end coils 5 are radially confined within a pair of substantially concentric tubes. The outer tube 6 is preferably of corrosion-resistant metal and is secured to the stacked laminations 2 adjacent the ends thereof by a plurality of plug welds 7. The welds 7 are preferably electric arc welds, and in addition to securing the tube 6 to laminations 2 the welds also hold the laminations tightly together in a rigid and compact core. Other ways of securing the laminations together may be employed as well as other methods of securing tube 6 to laminations 2.

The inner tube 8 is preferably a glass reinforced plastic that is of a composition to withstand heat and fluids within the working limits required. A good material for this purpose is a glass fiber reinforced thermo-setting resin. However, a tube of non-magnetic metal or other material, having high electrical and corrosion-resistant properties may be employed.

The slots 3 of laminations 2 may be lined with heavy paper or other suitable insulation material 9 which is lapped around the windings 4 at the mouth of each slot and held in place together with the windings by the slot stick 10. A center strip 11 may also be employed.

The coils 5 of the windings are enveloped and sealed by a material such as molded rubber 12, and the latter is also bonded to the end portions of inner tube 8 and outer tube 6 by the cement 13 adjacent the ends of laminations 2 where the tubes radially confine the end coils.

The ends of the stator 1 are sealed off by the end caps 14 which retain the rubber 12 to prevent deterioration thereof as described and claimed in the co-pending application of the present inventor entitled Dynamo-Electric Apparatus and Method of Making the Same, Serial No. 3,385, filed January 21, 1948. The end caps should also extend inwardly into the inner tube 8 a sufficient distance to hold tube 8 securely in place and prevent collapse against swelling of the rubber 12.

The outer tube 6 projects axially beyond the rubber 12 and the inner tube 8 and dowels 15 secure the end caps 14 to tube 6.

The rubber sheathed cable 16 is molded to rubber 12 and carries conductors 17 which are secured to end coils 5. The cable 16 extends through an opening in metal end cap 14 and is surrounded by a split flange 18 which is a part of the end cap.

The interlocking metal armour 19 is disposed around the cable 16 and held securely thereagainst by split clamp 20 assembled around flange 18 in a manner to force the flange in tight engagement with the armour. The lead construction described is particularly applicable when the stator is to be operated in oil. The armour 19 restrains the rubber sheath of cable 16 against excessive swelling that may effect deterioration of the rubber. If the motor is to be operated in relatively pure water the armour 19, flange 18 and clamp 20 may be eliminated.

The stator 1 of the invention may be assembled in a number of different ways. For example, the laminations 2 are stacked together with the slots longitudinally aligned and the slots are lined with insulating paper 9. The windings 4 are assembled in the slots with the parting strip 11 interposed in each slot between the conductors of the windings. The paper 9 is lapped at the mouth of the slots and slot sticks 10 are then inserted across the mouth of each slot.

The outer tube 6 is preferably next slipped over the laminated core and joined to the laminations by the plug welds 7, although the tube 8 might readily be assembled within the stator before tube 6 is applied.

After tube 6 is in place, the inner tube 8 may be applied in several different ways.

Tube 8 is preferably a generally thin seamless tube having a close fit within the stator core and a tube of this type is assembled with the core by merely inserting the same into the air gap of the stator from the end.

However, tube 8 may be a sheet of plastic or non-magnetic metal or like material which is formed into a tube by cementing the longitudinal seam with the plastic bonding cement 13 or by welding. The longitudinal edges of the sheet are tapered as illustrated in Fig. 6 to provide a lap seam.

If the inner tube 8 is a sheet bonded into a tube the outer surfaces of the sheet are first prepared with bonding cement 13 before the sheet is disposed within the air gap of the stator. The cement 13 also is provided along the longitudinal surfaces that are to be overlapped and bonded together.

The bonding together of the longitudinal edges of the tube and the bonding of the tube to the laminations is accomplished at the same time in a vulcanizing operation carried out by applying pressure and temperature to the assembled structure.

In this process the stator 1 is placed in a fixture comprising end rings 21 at each end of the stator held together by the longitudinal bars 22 secured to the end rings by suitable nuts to hold a flange on the end rings securely against laminations 2.

A collapsible bag 23 of suitable material is inserted within the tube 8 which has been disposed in the stator, and a determined amount of water is disposed in the bag through a suitable valved opening 24. The entire assembly is then placed in an oven, not shown. The steam from the water when heated expands the bag and forces the tube 8 against the laminations 2. In addition the heat and pressure vulcanizes the bonding cement 13 along the longitudinal ends of the tube to join the overlapping ends together, and at the same time cement 13 on the outer surface of tube 8 is vulcanized to join the tube to the laminations 2.

The next operation is that of molding the rubber 12 around the end coils 5. In this step the surface of tube 8 adjacent end coils 5 is prepared with bonding cement 13. The bonding cement 13 is also applied to the inner surface of outer tube 6 adjacent end coils 5. Cement 13 may be applied on the tubes by one or several applications.

The rubber 12 that is to be molded around the end coils is next introduced into the cavities at the ends of the stator. Rubber 12 is supplied in relatively small pieces so that it can be readily inserted into the stator cavities.

The inner tube 8 is supported against collapsing in the molding operation by a mandrel 25.

One end of mandrel 25 has a head flange 26 that abuts against an end ring 27 disposed against the rubber 12 assembled around one of the end coils 5 and fitting within the space between the corresponding ends of tubes 6 and 8.

A ring 28 is assembled against the rubber 12 disposed around the end coils 5 at the other end of the stator. A spring 29 encircles the mandrel 25 and one end thereof abuts against ring 28 and the other end abuts against nut 30 which is threaded onto the end of the mandrel.

The rings 27 and 28 are forced against the rubber 12 to apply pressure thereto to force the same around end coils 5 by threading nut 30 onto mandrel 25. This draws ring 27 inwardly and at the same time spring 29 is compressed to force ring 28 against rubber 12.

The cable 16 extends through a suitable opening in end ring 27 and is molded to rubber 12 in the same operation. The molding is completed by heating the structure to vulcanize, thermally set or bond the rubber in place while the rubber is held under pressure. The heating of the structure can be accomplished in an oven, not shown.

In the molding operation the cement 13 bonds the rubber 12 to the tubes 6 and 8 adjacent the end coils.

Under another method of the invention it is also possible to introduce heated rubber into the stator end cavities following the heating of the entire structure to molding temperatures.

After molding, the molding apparatus is removed and end caps 14 are secured to the outer tube by dowels 15. The molded rubber 12 around coils 5 is completely confined by the end caps and the ends of tubes 6 and 8. The cable 16 extends through the end cap 14 as previously described, and this is finally assembled by locating armour 19 therearound within flange 18 and then securing clamp 20 around flange 18.

Since the rubber 12 is confined within the ends of the tubes 6 and 8 by the caps 14 deterioration thereof is not effected should any fluid contact the rubber. The end caps and tube ends prevent the rubber from swelling to a point where the rubber will be injured. The same is also true of the cable 16 which is confined as described.

The term "rubber" as employed herein has reference to synthetic and natural rubbers and elastomers and includes natural rubber, polyvinyl chloride acetate resins, polyesters, organic polysulphides, butadiene styrene copolymers and chloroprene polymers and the like.

The invention provides a packaged unit that is readily made and particularly applicable to motors to be operated in oil or water under service conditions requiring a stator or other similar dynamo-electric apparatus that will not deteriorate, since the windings and coils are sealed off from contact with the oil or water and protected from excessive heat.

Various embodiments of the invention may be employed within the scope of the accompanying claims.

I claim:

1. Submersible dynamo-electric apparatus having a stator comprising a plurality of stacked laminations having electric windings assembled in slots therein and end coils disposed at each end thereof, a pair of concentric tubes radially confining said laminations and end coils therebetween, the inner of said tubes being formed of thin non-magnetic material to minimize the air gap reluctance of said apparatus, resilient molded rubber enveloping said end coils and occupying substantially the entire space between the projecting end portions of said tubes, and an opposed pair of end caps disposed at the ends of the tubes in engagement with said rubber to close the ends of the tubes and confine the rubber against substantial swelling upon contact with the fluid submerging the apparatus, said end caps having inwardly axially extending portions engaging the inner surface of said inner tube opposite said confined rubber to prevent collapse of said inner tube under the pressure of said rubber.

2. Submersible dynamo-electric apparatus having a stator comprising a plurality of stacked laminations having electric windings assembled in slots therein and end coils disposed at each end thereof, a pair of concentric tubes radially confining said laminations and end coils therebetween, resilient molded rubber enveloping said end coils and sealing the same between the projecting ends of said tubes, lead wires extending from said end coils and enclosed by a rubber cable, metal armor surrounding said cable to prevent destructive swelling thereof, and end caps closing the space between corresponding ends of the tubes and restraining the rubber against substantial swelling upon contact with a deteriorating fluid medium, said end caps having inwardly axially extending portions bearing outwardly against the inner of said tubes opposite said restrained rubber to prevent collapse of said inner tube under the pressure of said rubber.

3. Submersible dynamo-electric apparatus comprising a plurality of stacked laminations having electric windings assembled in slots therein and end coils disposed at each end thereof, a metal tube secured to the outside of said laminations and projecting therefrom adjacent said end coils, a liner tube of generally thin non-magnetic material disposed on the inside of said laminations and projecting outwardly therefrom adjacent said end coils, molded rubber enveloping said end coils between the projecting ends of said tubes and bonded to the tubes, and end caps secured at the ends of the tubes to close the space between the same and disposed with the end portions of said tubes to confine the rubber against deterioration from contact with fluid, said end caps being provided with inwardly axially extending portions bearing outwardly against said liner tube opposite said confined rubber to prevent collapse of said liner tube under the pressure of said rubber.

ORRIN E. ANDRUS.

REFERENCES CITED

The following references are of record in the file of this patent:

UNITED STATES PATENTS

| Number | Name | Date |
| --- | --- | --- |
| 1,269,909 | Cooper | June 18, 1918 |
| 1,507,606 | Kando | Sept. 9, 1924 |
| 1,543,502 | Hobart | June 23, 1925 |
| 1,930,797 | Gold et al. | Oct. 17, 1933 |
| 2,385,385 | Sigmund et al. | Sept. 25, 1945 |
| 2,428,816 | Sigmund et al. | Oct. 14, 1947 |

FOREIGN PATENTS

| Number | Country | Date |
| --- | --- | --- |
| 283,921 | Great Britain | Sept. 20, 1928 |
| 438,867 | Great Britain | of 1934 |
| 451,776 | Great Britain | Aug. 11, 1936 |